(No Model.)
W. HAILES, Dec'd.
W. H. & F. A. HAILES, Executors.
BROILER.
No. 518,243. Patented Apr. 17, 1894.
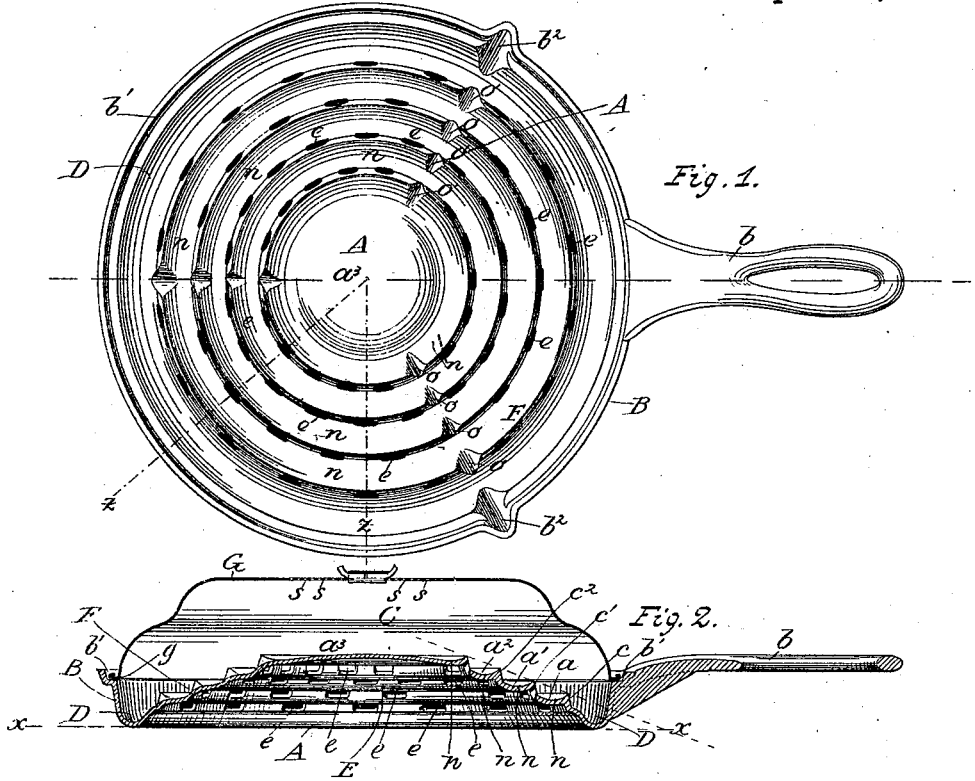
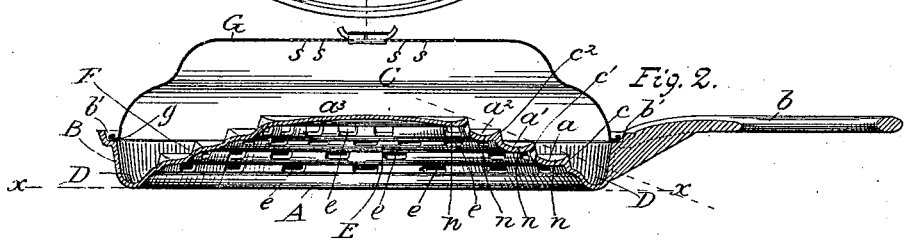
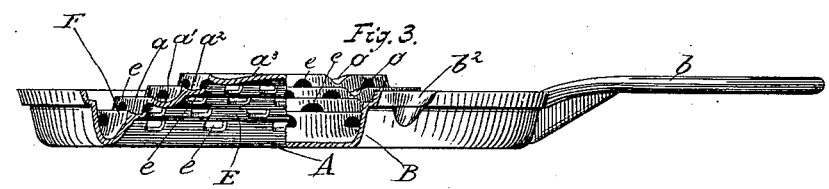
Witnesses.
Alex. DeKirk
Fred. A. Hailes
William Hailes
Inventor.
THE NATIONAL LITHOGRAPHING COMPANY,
WASHINGTON, D. C.

UNITED STATES PATENT OFFICE.

WILLIAM HAILES, OF ALBANY, NEW YORK; WILLIAM H. HAILES AND FREDERICK A. HAILES EXECUTORS OF SAID WILLIAM HAILES, DECEASED.

BROILER.

SPECIFICATION forming part of Letters Patent No. 518,243, dated April 17, 1894.

Application filed February 24, 1891. Renewed September 27, 1893. Serial No. 486,633. (No model.)

*To all whom it may concern:*

Be it known that I, WILLIAM HAILES, a citizen of the United States, residing at Albany, in the county of Albany and State of New York, have invented certain new and useful Improvements in Broilers, of which the following is a specification.

My invention relates to a broiler having the elements and devices hereinafter described and set forth in the claims; and it consists, primarily, in a body, for supporting the articles to be cooked, composed of a series of step like holding or supporting pieces or portions, rising successively from a low to the highest plane, and having with elevated step like portions a series of perforations made in the risers thereof; secondly, in the particular elements or devices by which my invention may be embodied in broilers and be made to include advantageous forms of constructions of parts; and further in the combination with the essential features in this improved broiler of a cover which will permit a ventilation of the broiler when used for cooking.

The objects of my invention are to provide in a broiler means for supporting the articles, to be cooked, at a slight incline, with provision for free passage, through numerous perforations provided in the risers of the supporting parts, of the products of combustion or heat, from the fire to contact with the article being cooked, and to provide means for catching the juices from the cooking articles and conducting the same to a suitable receptacle below the plane of the lowest step like supporting part of the broiler and preventing the passage of the juices into the fire, and also to provide means by which the article being broiled may be covered and the chamber of the broiler be, at will, ventilated. I attain these objects by the means illustrated in the accompanying drawings, forming a part of this specification, in which—

Figure 1, is a plan view of a broiler embodying the features of my invention. Fig. 2, is a sectional elevation of the same, with a cover applied thereto, and Fig. 3 is a side elevation with part broken away for exposing other parts, and part shown in section.

The same letters of reference refer to like parts throughout the several views.

In the drawings A represents the body proper of this broiler; B is the outer inclosing wall or side of the same; $b$ is a handle made integral with said inclosing wall or side, and C is the cover.

This broiler can be made of cast metal or be made of sheet metal struck up in form by suitable dies or other known means, or be made of wrought iron or wrought and cast metal combined as may be preferred; and it may be made with any suitable form, as circular, square or oblong or otherwise; and although it may be made to consist of a single piece, yet it may be made of several pieces suitably connected together.

The body proper A of this broiler is composed of a series of ledges or shelves $a, a', a^2$, &c., arranged in a step like manner and successively rising one above the other from a low plane, or from the receptacle D for the juices, to the plane of the uppermost ledge or shelf of the series; and although these ledges $a, a', a^2$, may be made in straight lines, and rise successively one above the other, starting from a low plane and wholly from one or two sides of the broiler and advancing toward one or two opposite sides, instead of toward the center of broiler; yet I prefer to construct these ledges or shelves $a\ a'\ a^2$, &c., as shown in Fig. 1, and arrange them so that they will rise successively one above the other, all around, in the body proper of this broiler as shown in said Fig. 1, with the lowest ledge or shelf $a$ rising from the receptacle D, for the juices, by the riser portion $c$, and the second ledge or shelf $a'$ rising by riser portion $c'$ from ledge $a$ below, and the third ledge or shelf $a^2$ rising from ledge $a'$ by the riser portion $c^2$, and so on to the last or topmost ledge or shelf in the series of ledges or shelves employed. Three or more of these successively elevated ledges or shelves may be employed to form the body proper of this broiler; in which the outer corner edges of each ledge or shelf will be on a line drawn at an angle with the horizontal line of the base of the broiler, as on horizontal line $x$ Fig. 2, so that articles of food supported by a series of these outer corners of said ledges will be free from contact with either the upper surfaces of the said ledges or the front or outer surfaces of the risers of the same. There are provided at intervals in the risers $c\ c'\ c^2$, &c., perforations or openings $e\ e$ which communicate from the concave form chamber E, in the under side of the broiler, to the chambers F between the series of ledges $a\ a'\ a^2$ and their risers $c\ c'\ c^2$, and the outer inclosing wall B. Although these ledges or shelves $a\ a'\ a^2$ may be made substantially flat in their upper or top surfaces, yet I prefer to make them with concave form of surfaces $n$, so as to produce shallow gutters, or troughs, which will catch the juices from the articles being cooked. These gutter form ledges or shelves are each provided with one or more outlets $o$ by which the juices from the higher gutter like ledges may run down into the lower ones and from these into the receptacle D without liability of any portion escaping through the openings $e\ e$, in the risers, into the fire below.

In the upper margin of the wall B is seat $b'$, for receiving a suitable cover. This wall B is also provided at one or more points in the same with pouring spouts or lips $b^2$, through which the juices or liquid from the cooked article may be run out from the broiler or the receptacle D. These pouring spouts are each located on a line with the line of a series of outlets $o\ o$ leading from the respective ledges in the series of the same, as illustrated in Fig. 1. The uppermost one of the ledges or shelves in the series, as shelf $a^3$, is preferably made with a broad or platform like form, as shown, and at its outer side margin this broad shelf is made concave so as to form the shallow gutter $n$ shown in Fig. 2, while its central portion is made convex as shown in the same figure. This top platform or shelf $a^3$ with its convex form of central portion and its concave margin portion is provided with an outlet $o$ similar to outlets $o\ o$ of the gutter form shelves or ledges $a\ a'\ a^2$, and allows an operator to flush the several parts of this broiler with water, when desirable, by pouring it on the convex central portion of the shelf or platform $a^3$, from which the water will flow successively through the outlets $o\ o$, provided, in the respective gutters of the ledges $a\ a'\ a^2$, and thence into the receptacle D, washing, in its course, the juices down with it into said receptacle, without liability of any of the water passing through the openings $e\ e$ into the fire.

G is the cover which is made with a chambered or concave form in its lower side, and a margin edge $g$ to rest on the seat $b'$ made in the upper margin of the wall B. Although in some cases this cover can be made solid in all its portions, yet it is preferred to provide in its more central portion a series of small perforations $s\ s$ which will admit the passage of air or gases or vapors through the cover in small currents, in either direction accordingly as the draft may be, when the broiler is used. In some cases the perforated cover may be provided with a registering plate having in it corresponding perforations and adapted to be operated to open or close the perforations in the cover, at will. This cover may be provided with any suitable handle for convenience of lifting and placing the same.

When the articles to be cooked are placed on the ledges of this broiler, they will be supported free from contact with the surfaces of said ledges and their respective risers and be supported substantially from the corners or outer edges of the said ledges, with a space between the surfaces of the articles and those of the said ledges and risers, which will allow the heat or products of combustion, by which the articles are cooked, to freely pass from the fire, through the many perforations $e\ e$, in the risers and moves in contact with the lower surfaces of the articles cooking, and thence through the interstices, spaces, or openings which may be between the pieces of the same and through the openings in the lower risers, and thence over their outer, or upper side surfaces, while the spent heat and vapors will escape through the perforations $s\ s$ in the cover when they are open.

Having described my invention, what I claim, and desire to secure by Letters Patent, is—

1. A broiler having two or more continuous ledges or shelves $a\ a'\ a^2$ which are arranged on different planes, one above the other in a step like form, and are separated from each other by vertically extended risers $c, c'\ c^2$ provided at intervals with lateral perforations $e\ e$ which communicate from a chamber, provided in the lower side of the broiler, to the chamber above for containing the articles to be broiled, substantially as and for the purposes set forth.

2. A broiler provided with two or more continuous ledges or shelves $a\ a'\ a^2$ arranged on different planes, one above the other, and having their upper sides concave in their cross direction and provided with outlets $o\ o$, and separated each from its neighboring ledge or shelf by vertically extended risers $c\ c'\ c^2$, which are provided at intervals with lateral perforations $e\ e$ communicating from a chamber, located below the said concave ledges, to a chamber for containing articles to be cooked, and provided with the juice or liquid receptacle D, between the lowermost ledge $a$ and the outer inclosing wall B substantially as and for the purposes set forth.

3. A broiler having a series of gutter form ledges or shelves, provided each with one or more outlets, and rising step like successively one above the other by laterally perforated risers, and having a broad shelf or platform which is elevated above the uppermost one of said ledges by a similar perforated riser and is provided at its edge margin with a shallow gutter having one or more outlets to the gutter form ledge next below, and having at the base of the said series of ledges, the receptacle D, substantially as and for the purposes set forth.

4. The combination with a broiler having two or more continuous gutter form ledges or shelves $a\ a'\ a^2$ which are arranged on different planes, one above the other, and separated by vertically extended risers $c\ c'\ c^2$ having in them at intervals the perforations $e\ e$ and inclosed by the outer wall B having in its upper margin edge the seat $b^2$, of the ventilated cover G, substantially as and for the purposes set forth.

WILLIAM HAILES.

Witnesses:
ALEX. SELKIRK,
FRED. A. HAILES.